Patented Sept. 29, 1925.

1,555,217

UNITED STATES PATENT OFFICE.

PAUL KARRER, OF ZURICH, SWITZERLAND, ASSIGNOR TO CHEMICAL WORKS FLORA, OF DUBENDORF, NEAR ZURICH, SWITZERLAND.

PROCESS FOR OBTAINING AMINO-BENZOYL DERIVATIVES OF 2-METHYL-4-DIETHYL-AMINO-PENTANOL-5 AND 2-METHYL-4-DIMETHYL-AMINO-PENTANOL-5.

No Drawing.      Application filed July 9, 1923. Serial No. 650,492.

*To all whom it may concern:*

Be it known that I, PAUL KARRER, a citizen of the Republic of Switzerland, residing at Zurich, Switzerland, have invented certain new and useful Improvements in process for obtaining amino-benzoyl derivatives of 2-methyl-4-diethylamino-pentanol-5 and 2-methyl-4-dimethyl-amino-pentanol-5; and I do hereby declare the following to be a full, clear, and exact description of the invention, such as will enable others skilled in the art to which it appertains to make and use the same.

The amino-benzoic acid esters of 2-methyl-4-diethylamino-pentanol 5 have never previously been discovered.

They can be obtained from the corresponding alcohols in the following way:

Example:—5 gr. of 2-methyl-4-diethylamino-pentanol-5

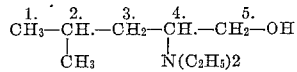

is dissolved in 20 gr. of dry chloroform, 5 gr. of para-nitro-benzoyl-chloride is added and the mixture raised to boiling point on a water-bath. Decomposition rapidly takes place. It is then cooled in a freezing mixture, and a little ether is added. An oil is then disengaged, and this presently solidifies into crystals. This product is the para-nitro-benzoic-acid ester of 2-methyl-4-diethylamino-pentanol-5-hydrochloride:

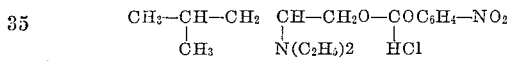

The compound is recrystallized from a mixture of alcohol and ether. The melting point is 163° C.

The reduction of this nitro-compound can be carried out by any of the usual methods, for instance with tin and hydrochloric acid, or with hydrogen in the presence of a catalyzer etc. for example: 10 gr. of nitro-benzol-2-methyl-4-diethylamino-pentanol-5 hydrochloride may be dissolved in 50 cc. of water, a little platinum black is added, and the solution shaken in a current of hydrogen. The hydrogen is rapidly absorbed. Reduction is complete by the end of an hour.

The solution is then filtered from the platinum and evaporated, after which the amino-benzoyl-2-methyl-4-diethylamino-pentanol-5-hydrochloride remains as a white crystaline residue. Melting point 190° C.

The hydrochloride is easily soluble in water and gives a neutral reaction. It has valuable anæsthetic and therapeutic properties and is free from irritating action.

My new substance acts as quickly as cocaine and penetrates the cornea as deeply and is about eight times as strong as "novocaine."

Its solutions are stable and sterilizable, and their actions remain longer, and when applied to the eye produce a contraction of the pupil.

Chemically my new substance is distinguished from "novocaine" by a lengthening of the carbon chain.

I claim—

1. Process of obtaining the para-aminobenzoic acid ester of 2-methyl-4-diethylamino-pentanol-5, which comprises reacting on 2-methyl-4-diethylamino-pentanol-5 with para-nitro-benzoyl-chloride, and reducing the resulting product.

2. Process of obtaining the para-aminobenzoic acid ester of 2-methyl-4-diethylamino-pentanol-5, which comprises reacting on 2-methyl-4-diethylamino-pentanol-5, with a para-nitro-benzoyl chloride and reducing the resulting nitro product by hydrogen gas in the presence of a catalyst.

3. Amino-benzoyl-2-methyl-4-diethylamino-pentanol-5-hydrochloride, a white, crystalline salt, having anæsthetic properties, non-irritating, melting at 190° C., and whose aqueous solution is stable.

In testimony that I claim the foregoing as my invention, I have signed my name.

PROF. DR. P. KARRER.